(12) United States Patent
Liang et al.

(10) Patent No.: US 10,936,543 B1
(45) Date of Patent: Mar. 2, 2021

(54) METADATA PROTECTED SPARSE BLOCK SET FOR SSD CACHE SPACE MANAGEMENT

(71) Applicant: EMC IP Holding Company LLC, Hopkinton, MA (US)

(72) Inventors: Shuang Liang, Los Altos, CA (US); Jayasekhar Konduru, Sunnyvale, CA (US); Mahesh Kamat, San Jose, CA (US); Akshay Narayan Muramatti, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 15/656,315

(22) Filed: Jul. 21, 2017

(51) Int. Cl.
*G06F 16/172* (2019.01)
*G06F 12/0893* (2016.01)

(52) U.S. Cl.
CPC ........ *G06F 16/172* (2019.01); *G06F 12/0893* (2013.01); *G06F 2212/60* (2013.01)

(58) Field of Classification Search
CPC .......................... G06F 16/172; G06F 2212/60
See application file for complete search history.

(56) References Cited

U.S. PATENT DOCUMENTS

| | | | |
|---|---|---|---|
| 7,085,911 | B2 | 8/2006 | Sachedina et al. |
| 7,818,515 | B1 | 10/2010 | Umbehocker et al. |
| 8,046,551 | B1 * | 10/2011 | Sahin ................. G06F 11/2074 711/162 |
| 8,190,835 | B1 | 5/2012 | Yueh |
| 8,204,868 | B1 | 6/2012 | Wu et al. |
| 8,396,841 | B1 | 3/2013 | Janakiraman |
| 8,732,403 | B1 | 5/2014 | Nayak |
| 8,782,323 | B2 * | 7/2014 | Glikson ............. G06F 12/0813 711/6 |
| 8,898,114 | B1 | 11/2014 | Feathergill et al. |
| 8,898,120 | B1 | 11/2014 | Efstathopoulos |
| 8,904,120 | B1 | 12/2014 | Killammsetti et al. |

(Continued)

FOREIGN PATENT DOCUMENTS

| | | |
|---|---|---|
| EP | 2738665 A1 | 6/2014 |
| EP | 2810171 B1 | 7/2019 |

(Continued)

OTHER PUBLICATIONS

International Search Report and Written Opinion issued in corresponding WO application No. PCT/US2018/027642, dated Jun. 7, 2018 (15 pages).

(Continued)

*Primary Examiner* — Yaima Rigol
*Assistant Examiner* — Alexander J Yoon
(74) *Attorney, Agent, or Firm* — Chamberlain, Hrdlicka, White, Williams & Aughtry

(57) ABSTRACT

A data management device includes a cache for a data storage device and a processor. The cache includes cache devices that store a block set. The processor obtains a cache modification request that specifies a first block of the block set, updates a copy of a header of the block set in each of the cache devices based on the modification request, updates a copy of meta-data of the block set in each of the cache devices based on the cache modification request, and updates the first block in a first cache device of the cache devices based on the cache modification request.

19 Claims, 15 Drawing Sheets

(56) References Cited

U.S. PATENT DOCUMENTS

| | | | |
|---|---|---|---|
| 8,918,390 | B1 | 12/2014 | Shilane et al. |
| 8,943,032 | B1 | 1/2015 | Xu et al. |
| 8,949,208 | B1 | 2/2015 | Xu et al. |
| 9,183,200 | B1 | 11/2015 | Liu et al. |
| 9,244,623 | B1 | 1/2016 | Bent et al. |
| 9,250,823 | B1 * | 2/2016 | Kamat ............... G06F 3/0647 |
| 9,251,160 | B1 | 2/2016 | Wartnick |
| 9,274,954 | B1 * | 3/2016 | Bairavasundaram ........................ G06F 12/0806 |
| 9,280,550 | B1 | 3/2016 | Hsu et al. |
| 9,298,724 | B1 | 3/2016 | Patil et al. |
| 9,317,218 | B1 | 4/2016 | Botelho et al. |
| 9,336,143 | B1 | 5/2016 | Wallace et al. |
| 9,390,116 | B1 | 7/2016 | Li et al. |
| 9,390,281 | B2 * | 7/2016 | Whaley ............... G06F 16/16 |
| 9,424,185 | B1 | 8/2016 | Botelho et al. |
| 9,442,671 | B1 | 9/2016 | Zhang et al. |
| 9,830,111 | B1 | 11/2017 | Patiejunas et al. |
| 10,002,048 | B2 | 6/2018 | Chennamsetty et al. |
| 10,031,672 | B2 | 7/2018 | Wang et al. |
| 10,078,451 | B1 | 9/2018 | Floyd et al. |
| 10,102,150 | B1 | 10/2018 | Visvanathan et al. |
| 10,175,894 | B1 | 1/2019 | Visvanathan et al. |
| 10,445,292 | B1 | 10/2019 | Zhang et al. |
| 2003/0110263 | A1 | 6/2003 | Shillo |
| 2005/0120058 | A1 | 6/2005 | Nishio |
| 2005/0160225 | A1 | 7/2005 | Presler-Marshall |
| 2005/0182906 | A1 * | 8/2005 | Chatterjee ............. G06F 11/201 711/144 |
| 2006/0075191 | A1 | 4/2006 | Lolayekar et al. |
| 2008/0082727 | A1 * | 4/2008 | Wang ............... G06F 12/0246 711/103 |
| 2008/0133446 | A1 | 6/2008 | Dubnicki et al. |
| 2008/0133561 | A1 | 6/2008 | Dubnicki et al. |
| 2008/0216086 | A1 | 9/2008 | Tanaka et al. |
| 2008/0244204 | A1 | 10/2008 | Cremelie et al. |
| 2009/0235115 | A1 | 9/2009 | Butlin |
| 2009/0271454 | A1 | 10/2009 | Anglin et al. |
| 2010/0049735 | A1 | 2/2010 | Hou |
| 2010/0094817 | A1 | 4/2010 | Ben-Shaul et al. |
| 2010/0250858 | A1 | 9/2010 | Cremelie et al. |
| 2011/0055471 | A1 | 3/2011 | Thatcher et al. |
| 2011/0099200 | A1 | 4/2011 | Blount et al. |
| 2011/0099351 | A1 | 4/2011 | Condict |
| 2011/0161557 | A1 * | 6/2011 | Haines ............... G06F 12/0893 711/103 |
| 2011/0185149 | A1 | 7/2011 | Gruhl et al. |
| 2011/0196869 | A1 | 8/2011 | Patterson et al. |
| 2011/0231594 | A1 * | 9/2011 | Sugimoto ............. G06F 3/0616 711/103 |
| 2011/0276781 | A1 | 11/2011 | Sengupta et al. |
| 2012/0158670 | A1 | 6/2012 | Sharma et al. |
| 2012/0209873 | A1 | 8/2012 | He |
| 2012/0278511 | A1 | 11/2012 | Alatorre et al. |
| 2013/0036098 | A1 | 2/2013 | Mutalik et al. |
| 2013/0055018 | A1 | 2/2013 | Joshi et al. |
| 2013/0060739 | A1 | 3/2013 | Kalach et al. |
| 2013/0111262 | A1 * | 5/2013 | Taylor ............... G06F 11/2005 714/4.11 |
| 2013/0138620 | A1 | 5/2013 | Yakushev et al. |
| 2014/0012822 | A1 | 1/2014 | Sachedina et al. |
| 2014/0040205 | A1 | 2/2014 | Cometto et al. |
| 2014/0047181 | A1 * | 2/2014 | Peterson ............. G06F 12/121 711/118 |
| 2014/0201169 | A1 | 7/2014 | Liu |
| 2014/0258248 | A1 | 9/2014 | Lambright et al. |
| 2014/0258824 | A1 | 9/2014 | Khosla et al. |
| 2014/0281215 | A1 | 9/2014 | Chen et al. |
| 2014/0310476 | A1 | 10/2014 | Kruus |
| 2015/0074679 | A1 | 3/2015 | Fenoglio et al. |
| 2015/0106345 | A1 | 4/2015 | Trimble et al. |
| 2015/0178171 | A1 | 6/2015 | Bish et al. |
| 2015/0331622 | A1 | 11/2015 | Chiu et al. |
| 2016/0026652 | A1 | 1/2016 | Zheng |
| 2016/0112475 | A1 | 4/2016 | Lawson et al. |
| 2016/0188589 | A1 | 6/2016 | Guilford et al. |
| 2016/0224274 | A1 | 8/2016 | Kato |
| 2016/0239222 | A1 | 8/2016 | Shetty et al. |
| 2016/0323367 | A1 | 11/2016 | Murtha et al. |
| 2016/0342338 | A1 | 11/2016 | Wang |
| 2017/0093961 | A1 | 3/2017 | Pacella et al. |
| 2017/0199894 | A1 | 7/2017 | Aronovich et al. |
| 2017/0220281 | A1 | 8/2017 | Gupta et al. |
| 2017/0220334 | A1 | 8/2017 | Hart et al. |
| 2017/0300424 | A1 | 10/2017 | Beaverson et al. |
| 2017/0352038 | A1 | 12/2017 | Parekh et al. |
| 2017/0359411 | A1 | 12/2017 | Burns et al. |
| 2018/0089037 | A1 | 3/2018 | Liu et al. |
| 2018/0146068 | A1 | 5/2018 | Johnston et al. |
| 2018/0322062 | A1 | 11/2018 | Watkins et al. |

FOREIGN PATENT DOCUMENTS

| | | |
|---|---|---|
| WO | 2013056220 A1 | 4/2013 |
| WO | 2013115822 A1 | 8/2013 |
| WO | 2014185918 A1 | 11/2014 |

OTHER PUBLICATIONS

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

International Search Report and Written Opinion issued in corresponding PCT Application PCT/US2018/027646, dated Jul. 27, 2018. (30 pages).

Deepavali Bhagwat et al.; "Extreme Binning: Scalable, Parallel Deduplication for Chunk-based File Backup"; IEEE MASCOTS; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

Aseem Kishore; "What is a Checksum and How to Calculate a Checksum"; Online Tech Tips; Feb. 18, 2015; https://www.online-tech-tips.com/cool-websites/what-is-checksum/.

* cited by examiner

METADATA PROTECTED SPARSE BLOCK SET FOR SSD CACHE SPACE MANAGEMENT

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data management device in accordance with one or more embodiments of the invention includes a cache for a data storage device and a processor. The cache includes cache devices that store a block set. The processor obtains a cache modification request that specifies a first block of the block set, updates a copy of a header of the block set in each of the cache devices based on the modification request, updates a copy of meta-data of the block set in each of the cache devices based on the cache modification request, and updates the first block in a first cache device of the cache devices based on the cache modification request.

In one aspect, a method of operating a data management device in accordance with one or more embodiments of the invention includes obtaining, by the data management device, a cache modification request that specifies a first block of the block set of a cache of the data management device; updating, by the data management device, a copy of a header of the block set in each cache device of the cache based on the modification request; updating, by the data management device, a copy of meta-data of the block set in each of the cache devices based on the cache modification request; and updating the first block in a first cache device of the cache devices based on the cache modification request.

In one aspect, a non-transitory computer readable medium in accordance with one or more embodiments of the invention includes computer readable program code, which when executed by a computer processor enables the computer processor to perform a method for operating a data management device, the method including obtaining, by the data management device, a cache modification request that specifies a first block of the block set of a cache of the data management device; updating, by the data management device, a copy of a header of the block set in each cache device of the cache based on the modification request; updating, by the data management device, a copy of meta-data of the block set in each of the cache devices based on the cache modification request; and updating the first block in a first cache device of the cache devices based on the cache modification request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
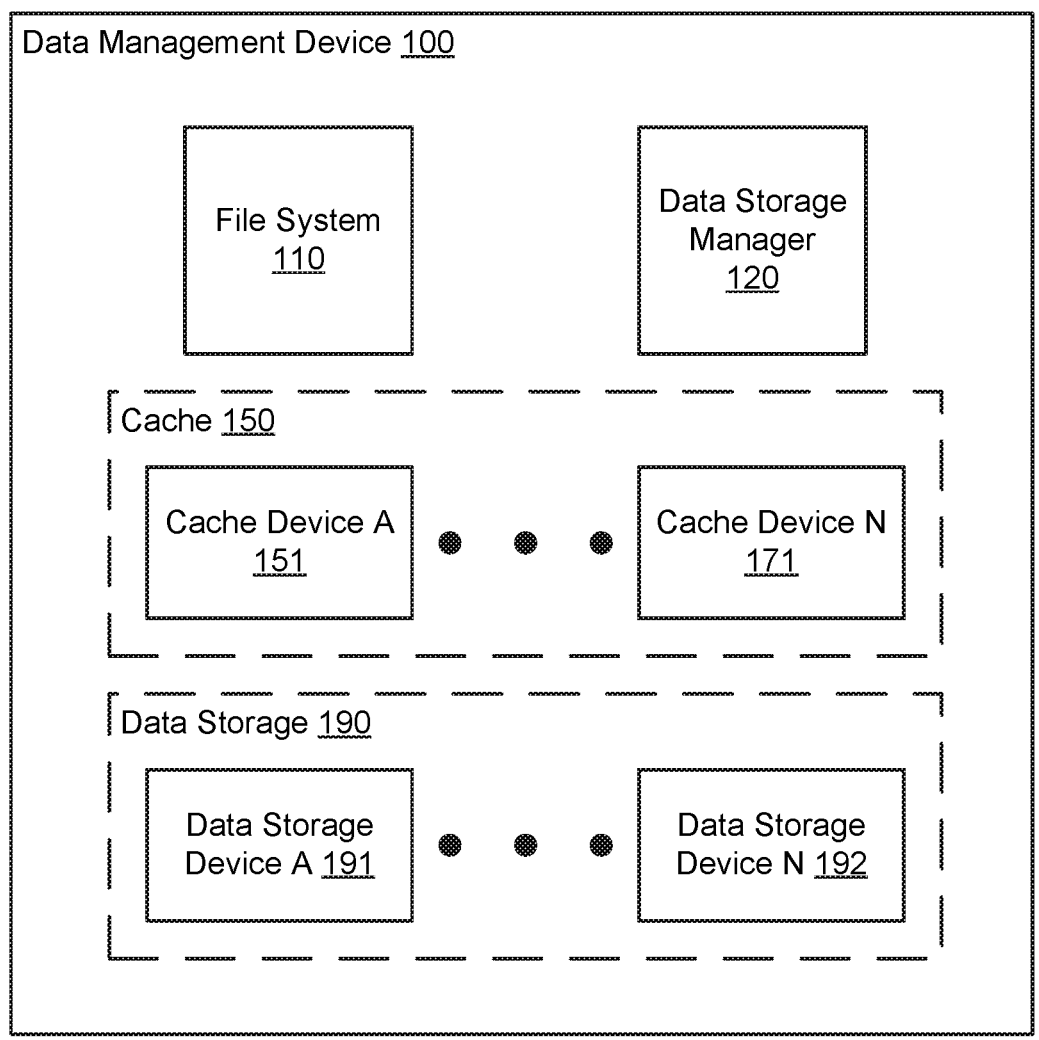
FIG. 1A shows a diagram of a device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to devices, methods, and systems for operating a data management device. The data management device may include a data storage for storing data and a cache that mirrors a portion of the data stored in the data storage. The cache may be distributed across a number of physical storage devices, i.e., cache devices. The physical storage devices may be, for example, solid state drives.

In one or more embodiments of the invention, the cache may implemented as a block set. A block set may be a data structure. The block set may include a number of blocks that store portions of the data stored in the data storage. The block set may also include a header that stores characteristics regarding all of the blocks. The block set may include meta-data associated with each of the blocks.

In one or more embodiments of the invention, the block set may include redundancy features so that the cache may continue to operate so long as at least one cache device storing a portion of the block set is operational. The redundancy features may include mirroring the header and the meta-data across each cache device. The blocks may not be mirrored across each cache device.

In one or more embodiments of the invention, the meta-data may specify a current state of each block of the block set and a previous state of each block of the block set. In one or more embodiments of the invention, the current state may specify an unallocatable state. An unallocatable state indicates that the cache device assigned to store the associated block is unavailable or otherwise unable to perform input-output (IO) operations.

FIG. 1 shows a data management device (100) in accordance with one or more embodiments of the invention. The data management device (100) may store data in a data storage (190) and store a portion of the data in a cache (150).

The data management device (100) may be a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 2A-4A. The data management device (100) may be other types of computing devices without departing from the invention.

In one or more embodiments of the invention, the data management device (100) may be operably connected to a plurality of clients (not shown). Each of the clients may be programmed to store data via the data management device (100) and read data managed by the data management device (100). The clients may sends requests to store data or to read data to the data management device (100). The data management device (100) may respond to these requests by providing requested data or by storing to-be-stored data specified by the requests.

The data management device (100) may include a file system (110), a data storage manager (120), the cache (150), and the data storage (190). Each of the aforementioned components is discussed below.

The data management device (100) may include a file system (110). The file system (110) may be one or more data structures and methods implemented by the data management device (100) to partition and/or organize the storage of the cache (150) and data storage (190). The file system may organize the data storage capacity of each cached device (151, 171) of the cache (150) and each data storage device (191, 192) of the data storage (190) into file system blocks. Each file system block may include a predetermined number of bits. Each file system block may have a separate identifier.

The file system (110) may be a component of an operating system (not shown) of the data management device (100). The operating system may manage the physical components of the data management device (100) and thereby enable computer programs to be executed without having each computer program being capable of managing the physical components of the data management device (100).

The data management device (100) may include a data storage manager (120). The data storage manager (120) may process data storage requests and/or data access requests. Data storage requests may request that data be stored in the data storage (190) and the data access requests may request that data stored in the data storage (190) be provided.

In one or more embodiments of the invention, the data storage manager (120) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described above and the methods shown in FIGS. 2A-4.

In one or more embodiments of the invention, the data management device (120) may be implemented as computer instructions, e.g., computer code, stored on a persistent storage that when executed by a processor of the data management device (100) cause the data management device (100) to provide the functionality described above and the methods shown in FIGS. 2A-4.

The data management device (100) may include a cache (150). The cache (150) may be a storage managed by the file system (110). The cache (150) may store a copy of a portion of the data stored in the data storage (190). When a data access request is received, the data storage manager (120) may determine whether a copy of the data is stored in the cache (150). If a copy is stored in the cache (150), the copy may be retrieved from the cache provided in response to the request. If a copy is not stored in the cache (150), the data may be retrieve from the data storage and provided in response to the request.

In one or more embodiments of the invention, the cache (150) may be organized as a block set. The block set may be a data structure that provides redundancy features that enable the cache (150) to continue to operate so long as at least one physical device on which the cache is implemented is operational.

In one or more embodiments of the invention, the cache (150) may be implemented as a plurality of physical data storage devices, i.e., cache devices (151, 171). The block set may be distributed across each of the physical data storage devices. The physical data storage devices may be hard disk drives, solid disk drives, tape drives, zip drives, or other types of persistent physical storage devices. In one or more embodiments of the invention, the cache (150) may be a block set spanned across at least two solid state drives. In one or more embodiments of the invention, the solid state drives may include a serial ATA (SATA) interface.

For additional details regarding the cache, See FIGS. 1B-1F.

The data management device (100) may include a data storage (190). The data storage (190) may be a storage managed by the file system (110).

In one or more embodiments of the invention, the data storage (190) is implemented as a plurality of physical data storage devices, i.e., data storage devices (191, 192). The physical data storage devices may be hard disk drives, solid disk drives, tape drives, zip drives, or other types of persistent physical storage devices.

In one or more embodiments of the invention, the data storage (190) is implemented as a plurality of physical data storage devices, i.e., data storage devices (191, 192). The physical data storage devices may be hard disk drives, solid disk drives, tape drives, zip drives, or other types of persistent physical storage devices.

In one or more embodiments of the invention, the data storage (190 may be cloud resources. The cloud resources may be a logical storage that includes any number of physical storage devices distributed across any number of computing devices and operable linked and/or unified to form the logical storage. The logical storage may include redundancy or other data integrity features that ensure that failure of any of the physical storage elements does not cause data stored in the logical storage to be lost. The physical resources of the logical storage of the cloud resources may be physically separated across a number of computing devices other than the data storage device that are each operably connected to the cloud server (140).

In one or more embodiments of the invention, the data storage (190) may be a logical storage. The logical data storage comprising any number of physical and/or cloud resources linked to form a single logical storage. The physical resources may be, for example, hard disk drives, solid state drives, or any other type of persistent storage.

In one or more embodiments of the invention, the data storage (190) may be a deduplicated storage. As used herein, a deduplicated storage refers to a storage that attempts to reduce the required amount of storage space to store data by not storing multiple copies of the same files or bit patterns. Rather, when a new file or bit pattern is sent to the data storage (190) for storage, the data storage (190) may compare all or a portion of the new file or bit pattern to files or bit patterns already stored in the data storage (190). If the new file or bit pattern, or a portion thereof, matches a file or bit pattern, or a portion thereof, already stored in the data storage (190), the new file or bit pattern, or portion thereof, is not stored in the data storage (190) and the already stored file or bit pattern, or portion thereof, is associated with the filename included in the data storage request for later retrieval.

In one or more embodiments of the invention, a file or bit pattern stored in the data storage (190) may be associated with multiple clients. For example, if a first client requests that a unique file be stored in the data storage (190), the data storage (190) will store the unique file and only associate the stored unique file with the first client. However, if a second client requests that the unique file be stored in the data storage (190) after the unique file is already stored in the data storage (190), the data storage (190) will not store a second copy of the unique file in the data storage (190) but will associate the already stored file stored by the first client with the second client.

Thus, if a first client and a second client have requested that a unique file be stored in the data storage (190), each of the clients' file names for the unique file, or other identification information, will be associated with the stored unique file. Thus, the data of the stored unique file may be retrieved from the data storage (190) using any filename (or other identifier) given to the file by a client that requested that the unique file be stored in the data storage (190).

As discussed above, a cache may be implemented using a block set. The block set may allocate the storage of the cache devices. To provide redundancy, the block set may allocate portions of the storage capacity of each physical device of the cache to mirror data and may allocate other portions of each physical device of the cache without mirroring data. The mirrored data may include meta-data associated with blocks and a header that describes the block. The not mirrored data may include blocks that each include copies of data stored in the data storage.

Each cache device (151, 171) may include storage space that is divided by the file system into file system blocks. Each of these blocks may have a size, e.g., number of bytes, that is different from a size of the header, the meta-data, or any of the blocks.

Figure 1B:
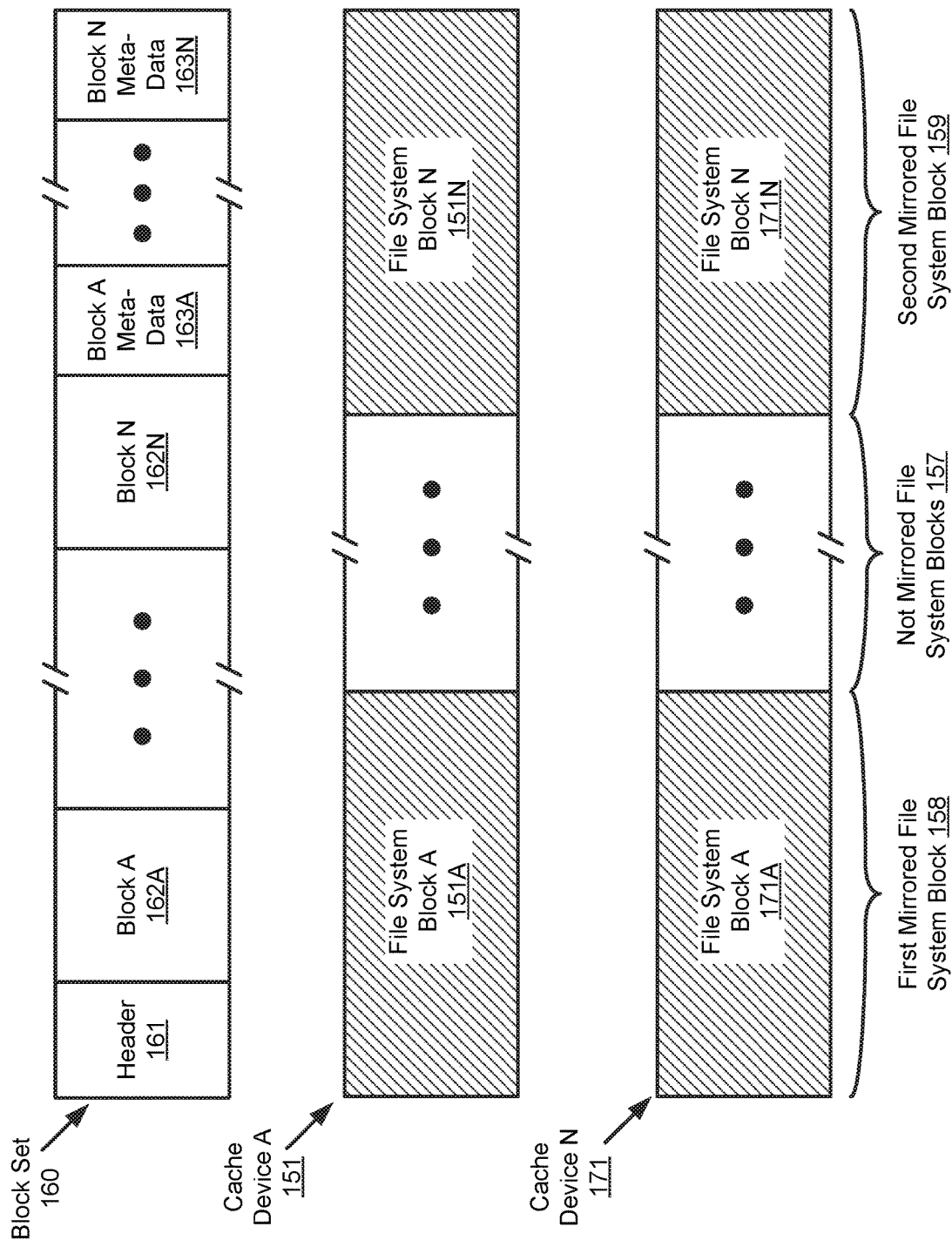
FIG. 1B shows a first diagram of data allocation of a block set, a first cache device, and a second cache device in accordance with one or more embodiments of the invention.
Figure 1C:
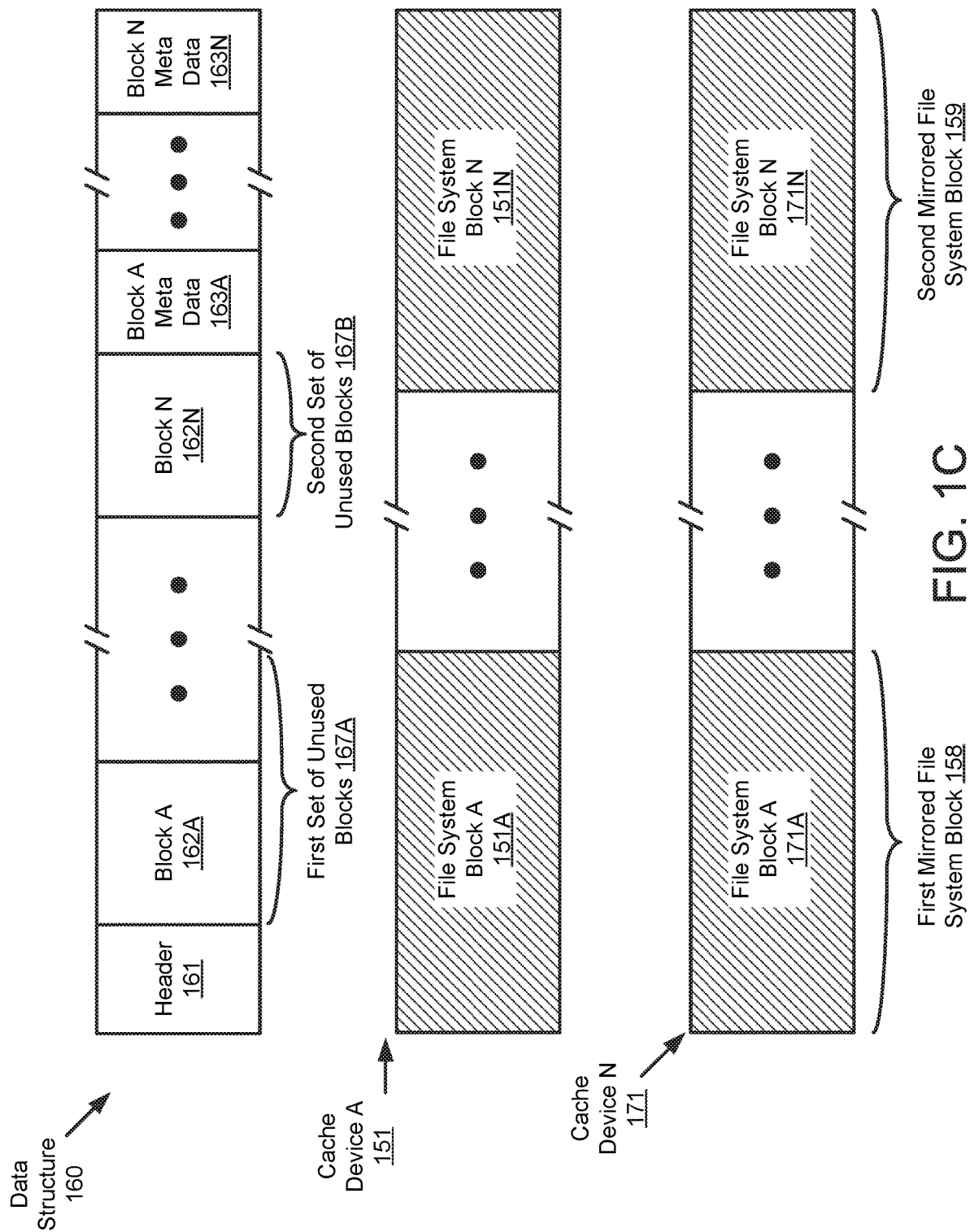
FIG. 1C shows a second diagram of data allocation of a block set, a first cache device, and a second cache device in accordance with one or more embodiments of the invention.
Figure 1D:
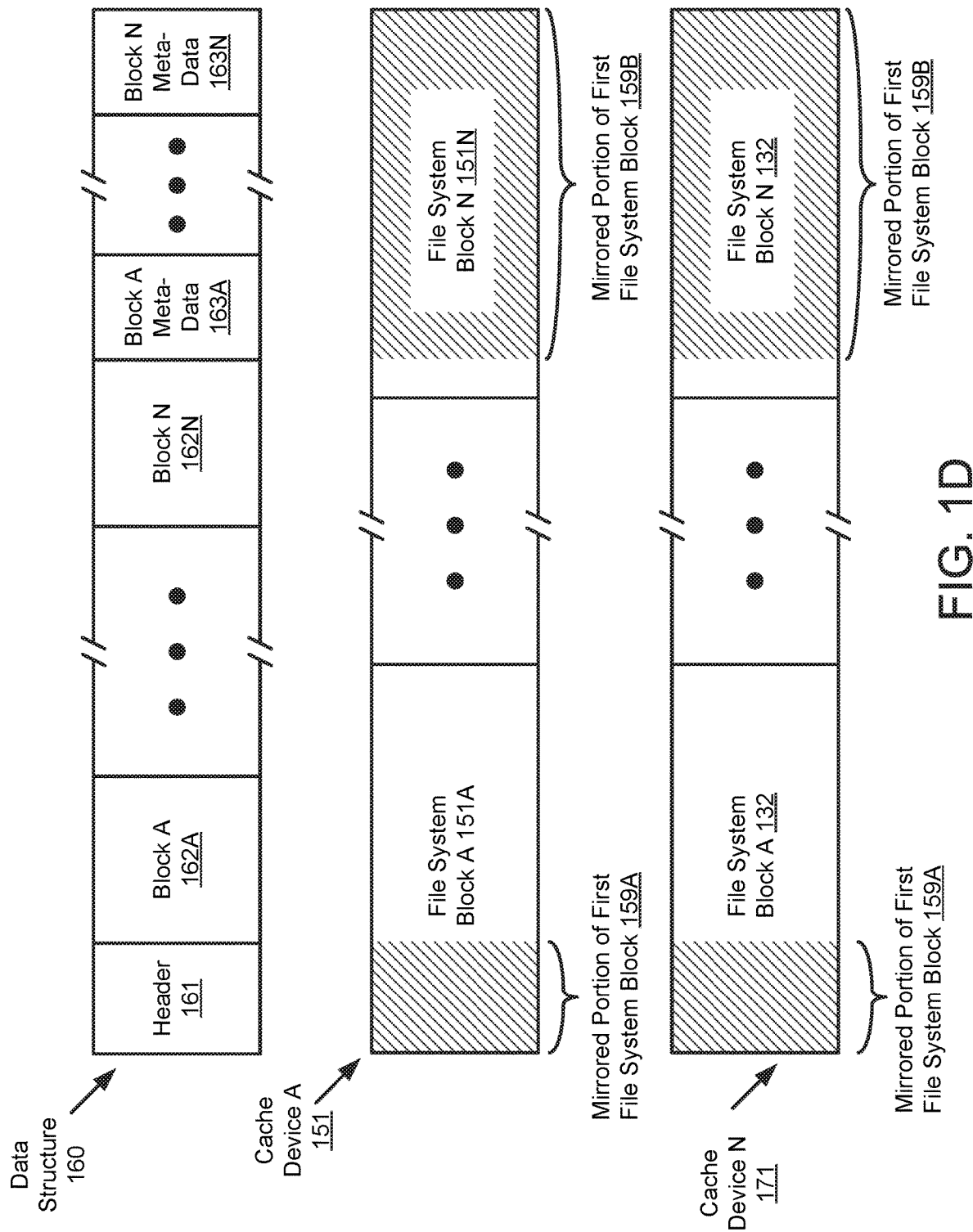
FIG. 1D shows a third diagram of data allocation of a block set, a first cache device, and a second cache device in accordance with one or more embodiments of the invention.

FIGS. 1B-1D show diagrams strategies for allocating cache devices using block sets. More specifically, each of FIGS. 1B-1D illustrate how the file system allocates the storage of cache devices (151, 171) and how an associated block set (160) allocates the file system allocated storage for mirroring data and not for mirroring data.

FIG. 1B shows a first diagram of a block set (160) and a cache in accordance with one or more embodiments of the invention.

The block set (160) includes a header (161), a number of blocks (162A, 162N), and a number of blocks of meta-data (163A, 163N) each of which is associated with a respective block (162A, 162N).

The header may be a data structure that includes information regarding all of the blocks (162A, 162N). For additional details regarding the header (161), See FIG. 1G.

The blocks (162A, 162N) maybe data structures including data. The data may be copies of data stored in the data storage.

The meta-data blocks (163A, 163N) may be data structures that include information regarding a respective block of the blocks (162A, 162N). For additional information regarding the meta-data blocks (163A, 163N), See FIGS. 1E and 1F.

The cache includes a number of cache devices (151, 171). Each of the cache devices (151, 171) include storage capacity managed by the file system. The file system divides the storage capacity of each of the cache devices (151, 171) into file system blocks. For example, the cache device A (151) is divided into file system blocks (151A, 151N) and the cache device N (171) is divided into file system blocks (171A, 171N). Each of the file system blocks may include a similar number of bytes.

To provide redundancy, at least two file system blocks are mirrored across each of the cache devices. The header (161) is stored in a first mirrored file system block (158) and the meta-data blocks (163A, 163N) is stored in a second mirrored file system block (159).

More file system blocks could be mirrored to provide redundancy if the header (161) or meta-data blocks (163A-163N) are larger than a file system block without departing from the invention.

In addition, at least a portion of a first block (162A, 162N) is also stored in the first mirrored file system block (158) and a portion of a second block (162A, 162N) is also stored in the second mirrored file system block (159). The aforementioned portions of blocks are stored in the mirrored file system blocks (158, 159) because the file system blocks (151A, 151N, 171A, 171N) are larger than the header (161) and meta data blocks (163A, 163N).

The blocks (162A, 162N) are distributed across the file system blocks that are not allocated as mirrored file system blocks (157).

Thus, in FIG. 1B, each cache device includes at least two mirrored file system blocks that include the header, the meta-data, and a portion of at least two blocks. Each cache device also includes a number of non-mirrored file system blocks that each include copies of data stored in the data storage.

The allocation scheme illustrated in FIG. 1B provides redundancy by mirroring the header and meta-data across multiple physical devices and thereby ensuring that the cache is still able to operate so long as at least one cache device is operational.

FIG. 1C shows a second diagram of a block set (160) and a cache in accordance with one or more embodiments of the invention. The block set (160) and the cache is nearly identical to the block set (160) and cache shown in FIG. 1B with the following two differences.

The first difference is that a first set of blocks (167A) are unused. In other words, copies of data of the data storage are not stored in the first set of blocks (167A). The first set of blocks (167A) may be the blocks that are a portion of the first mirrored file system block (158).

The second difference is that a second set of blocks (167B) are unused. In other words, copies of data of the data storage are not stored in the second set of blocks (167B). The second set of blocks (167B) may be the blocks that are a portion of the second mirrored file system block (159).

The allocation scheme illustrated in FIG. 1C provides redundancy by mirroring the header and meta-data across multiple physical devices and thereby ensuring that the cache is still able to operate so long as at least one cache device is operational. Additionally, by not storing data in the blocks that are a portion of the mirrored file system blocks (158, 159), 10 of the cache devices in minimized. Specifically, IO is reduced because data that does not need to be mirrored, i.e., the blocks, for the cache to continue to operation after a failure of one of the cache devices is not mirrored.

FIG. 1D shows a third diagram of a block set (160) and a cache in accordance with one or more embodiments of the invention. The block set (160) and the cache is nearly identical to the block set (160) and cache shown in FIG. 1B with the following two differences.

The first difference is that only a portion of a first file system block (159A) is mirrored and a portion of a second file system block (159B) is mirrored. The portion of the first file system block (159A) only includes the header (161). The portion of the second file system block (159B) only includes the meta-data. In contrast, entire file system blocks are mirrored in FIG. 1B.

The second difference is that each file system block (e.g., 151A, 151N) may also include a flat that specifies whether the file system block is a master or a slave (not shown). When attempting to read data stored in the blocks (162A-162N) of the blockset, the system will read the data from a file system block that is labeled as a master block and that includes the block. Blocks of the block set are not read from file system blocks that are labeled as slave blocks.

The allocation scheme illustrated in FIG. 1D provides redundancy by mirroring the header and meta-data across multiple physical devices without mirroring any of the blocks.

As discussed with respect to FIGS. 1B-1D, the block set includes meta-data associated with each of the blocks of the set.

Figure 1E:
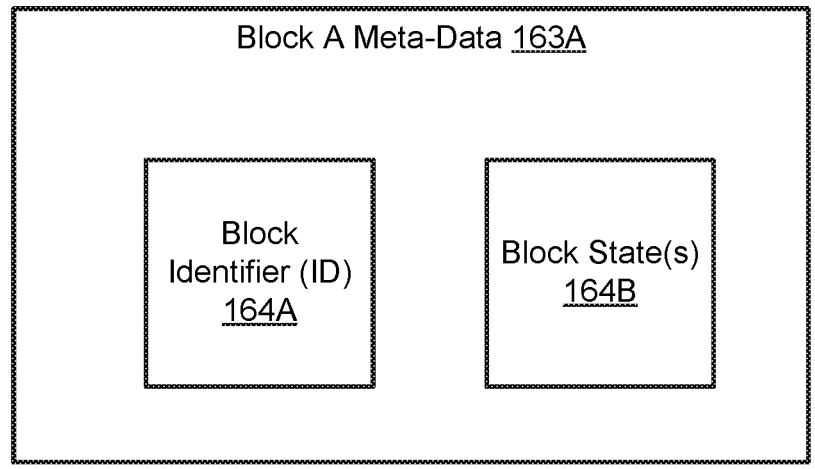
FIG. 1E shows a diagram of meta-data associated with a block in accordance with one or more embodiments of the invention.

FIG. 1E shows a diagram of meta-data associated with a block (163A) in accordance with embodiments of the invention. Meta-data may be a data structure that includes information regarding a block of the block set. The meta-data associated with a block (163A) may include a block identifier (ID) (164A) and block states (164B). Each of the types of information of the meta-data are discussed below.

The block ID (164A) maybe a name or bit sequence that identifies the block. For example, each block of the block set may include a different number or group of letters used as the identifier.

Figure 1F:
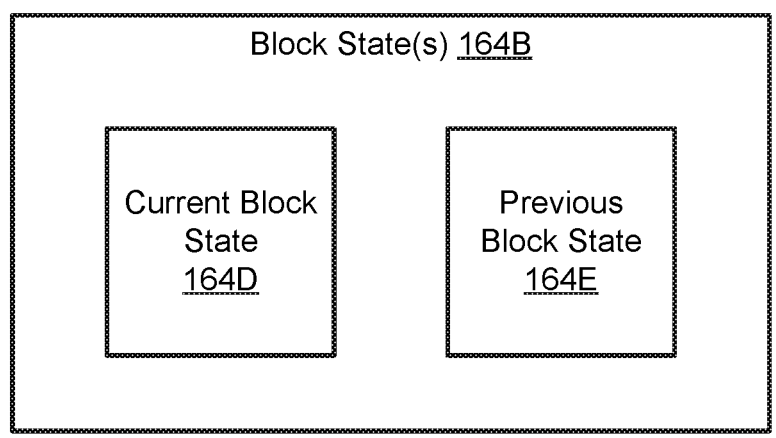
FIG. 1F shows a diagram of block states of the meta-data associated with the block in accordance with one or more embodiments of the invention.

The block state(s) (164B) may include information regarding the most recent two states. FIG. 1F shows a diagram of block state(s) (164B) in accordance with one or more embodiments of the invention. The block state(s) (164B) may include a current block state (164D) and a previous block state (164E). Each state may describe a state of allocation of the associated block. Each state may be set as one of six states: Allocated, Free_Pending, Free, Allocate_Pending, Allocate_Assigned, and Allocatable.

The allocatable state may indicate whether the associated block may be allocated. As used herein, allocatable means that the block is available for IO. The state may be set to allocatable when a cache device in which the block is stored is changing between being available and unavailable. For example, when a cache device fails it may be changing between being available and being unavailable.

Figure 1G:
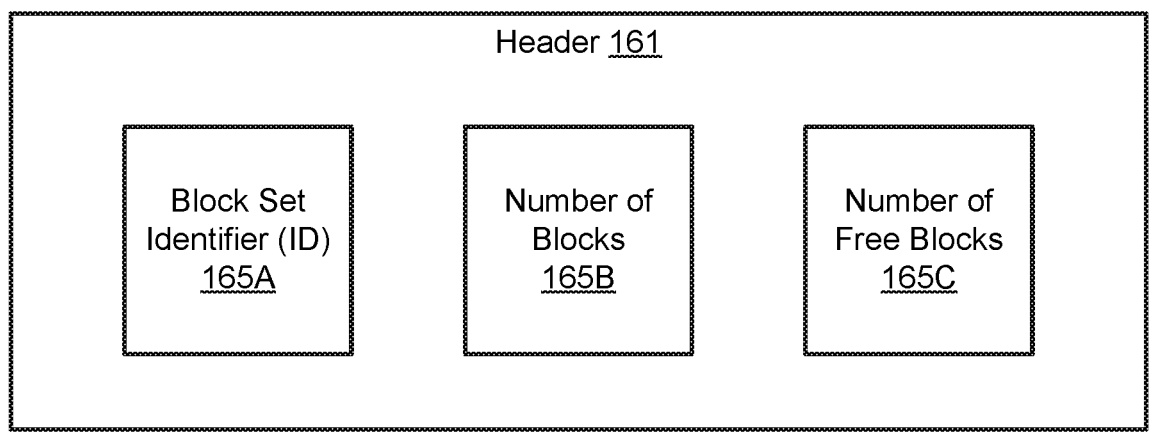
FIG. 1G shows a diagram of a header of a block set in accordance with one or more embodiments of the invention.

FIG. 1G shows a diagram of a header (161) in accordance with one or more embodiments of the invention. The header (161) may be a data structure that includes information regarding all of the blocks of the block set. The header (161) may specify a block set ID (165A) of the block set, the number of blocks (165B) of the block set, and the number of free blocks (165C) of the block set.

FIGS. 2A-4 show flowcharts of methods that may be performed by the device of FIG. 1A.

Figure 2A:
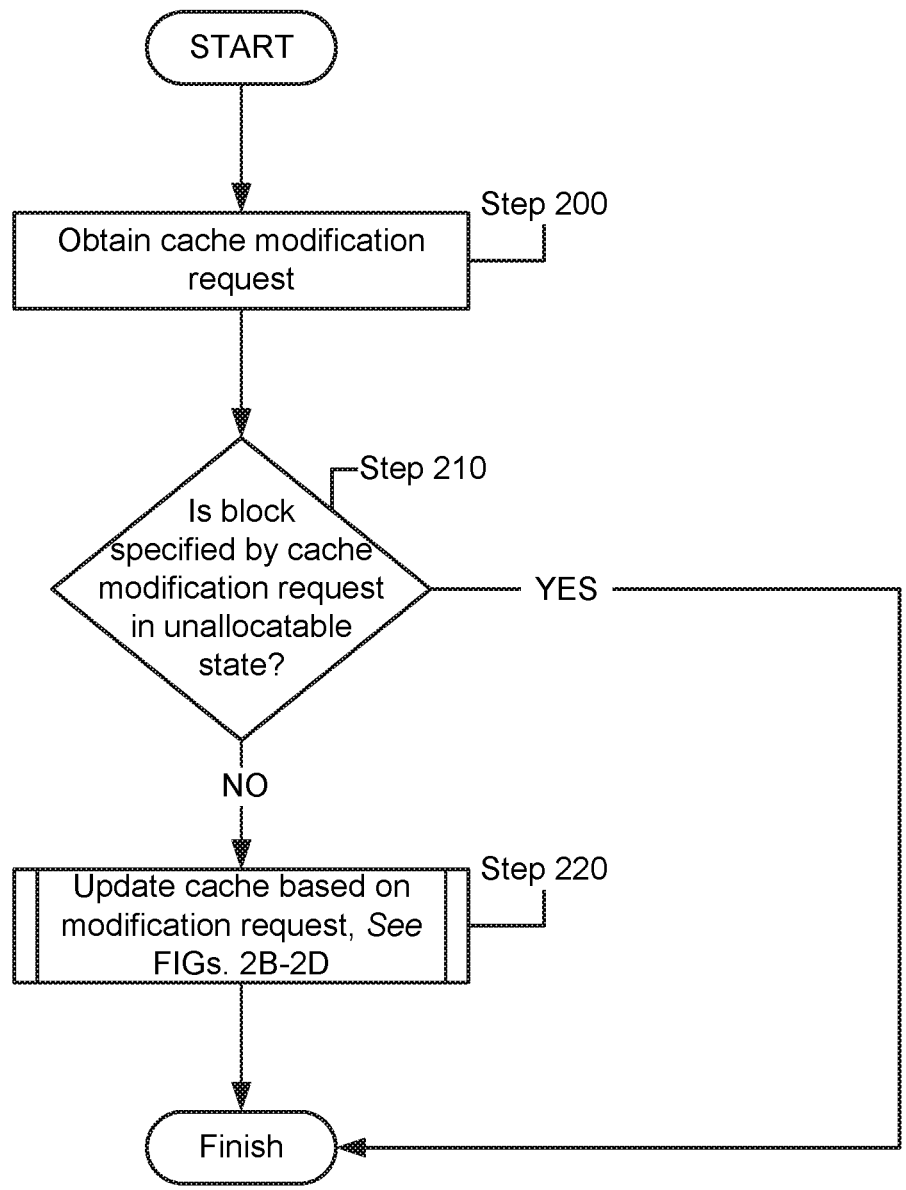
FIG. 2A shows a flowchart of a method of managing a cache in accordance with one or more embodiments of the invention.

FIG. 2A shows a flowchart of a method in accordance with one or more embodiments of the invention. The method depicted in FIG. 2A may be used to manage a cache in accordance with one or more embodiments of the invention. The method shown in FIG. 2A may be performed by, for example, a data management device (100, FIG. 1A).

In Step 200, a cache modification request is obtained. The cache modification request may specify a change to a block of the block set of the cache. The cache modification request may specify an addition of data stored in the data storage to a block of the block set of the cache. The cache modification request may specify a removal of data stored in a block of the block set of the cache.

In Step 210, it is determined whether the block specified by the cache modification is in an unallocatable state. The determination may be made by querying the meta-data associated with the block regarding the current state of the block. If the block is in an unallocatable state, the method may end. If the block is not in an unallocatable state, the method may proceed to Step 220.

In Step 220, the cache may be updated based on the modification request. The cache may be updated by modifying a block, the meta-data associated with the block, and a header based on the modification request. The cache may be updated by using one of the methods shown in FIGS. 2B-2D. Each method may be used in conjunction with one of the corresponding block sets illustrated in FIGS. 1B-1D.

The method may end following Step 220.

In one or more embodiments of the invention, multiple cache modification requests may be processed, multiple cache updates may be generated, and the multiple cache updates may be processed as a batch. Processing multiple cache updates as a batch may reduce the IO access of the physical devices hosting the cache. For example, every IO access of the physical devices hosting the cache may incur a fixed amount of computational/IO bandwidth. Processing multiple cache updates separately, rather than as a batch, may incur multiple IO access overhead costs. In contrast, processing multiple cache updates as a batch may only incur a single IO access overhead cost.

As noted above, FIGS. 2B-2D illustrate methods of updating a cache based on a modification request. Each of the methods may be used with any of the block sets illustrated in FIGS. 1B-1D.

Figure 2B:
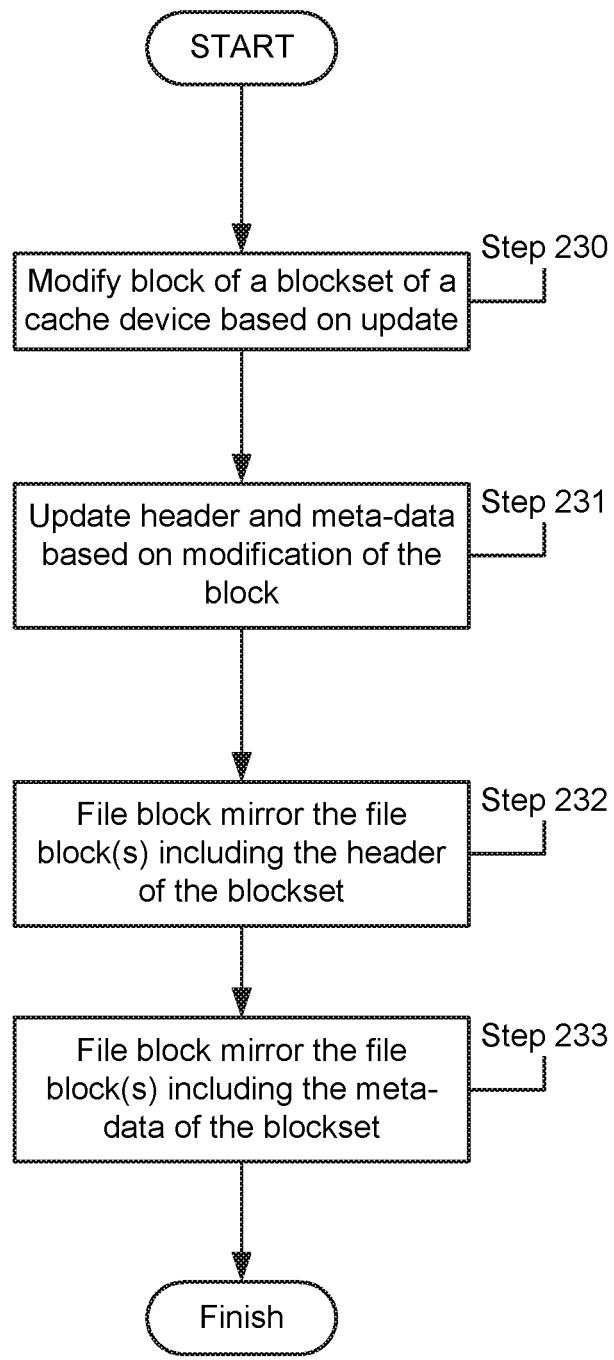
FIG. 2B shows a flowchart of a first method of updating a cache in accordance with one or more embodiments of the invention.

FIG. 2B shows a flowchart of a method in accordance with one or more embodiments of the invention. The method depicted in FIG. 2B may be used to update a cache in accordance with one or more embodiments of the invention. The method shown in FIG. 2B may be performed by, for example, a data management device (100, FIG. 1A).

In Step 230, a block of the block set of a cache device is modified based on the update. More specifically, the data of the block is modified based on the update. For example, an update that modifies data stored in an allocated block or removes data stored in an allocated block may cause the block storing the data to be modified. In contrast, an update that adds new data to the cache may cause a block that was not previously allocated to be modified, e.g., allocated.

In Step 231, the header of the block set and meta-data of the block set is updated based on the modification to the block. The number of free blocks of the header may be updated based on the allocation or deallocation of a block of the blockset. The block state(s) of the block meta-data associated with the block may be updated based on the change in block state, e.g., allocatable, free, etc., due to the update. The block type of the block meta-data associated with the block may be updated in response to the change in the data stored in the block.

In Step 232, the file block(s) including the header of the blockset are file block mirrored. As used herein, file block mirroring means to issue an IO request to the file system that mirrors a file block across all of the cache devices of the cache. As discussed with respect to FIGS. 1B-1D, mirroring a file block that includes the header also results in mirroring at least a portion of a block of the block set because the header does not exactly align to the file blocks, the size of the header is not an integer multiple of the size of the file block of the file system.

In Step 233, the file block(s) including the meta-data of the blockset are file block mirrored. As discussed with respect to FIGS. 1B-1D, mirroring a file block that includes the meta-data also results in mirroring at least a portion of a block of the block set because the meta-data does not exactly align to the file blocks, the size of the meta-data is not an integer multiple of the size of the file block of the file system.

The method may end following Step 233.

In one or more embodiments of the invention, multiple updates of the header and meta-data may be processed as a batch. Batch processing may reduce the IO of the physical disks hosting the cache.

Figure 2C:
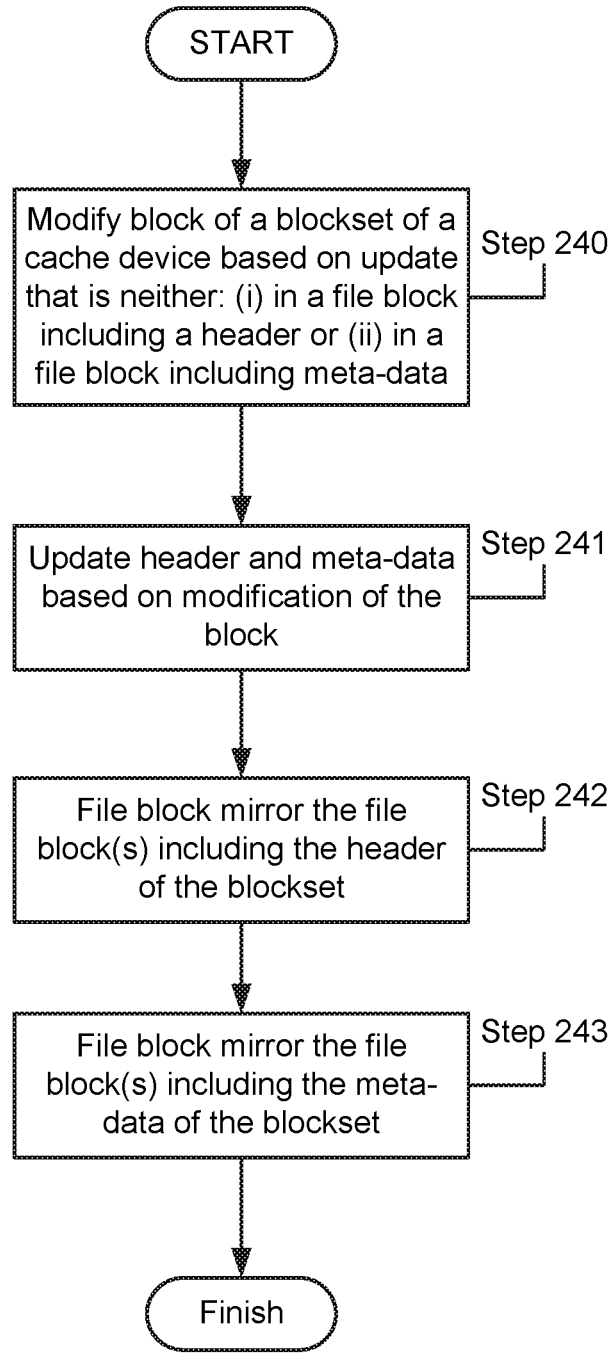
FIG. 2C shows a flowchart of a second method of updating a cache in accordance with one or more embodiments of the invention.

FIG. 2C shows a flowchart of a method in accordance with one or more embodiments of the invention. The method depicted in FIG. 2C may be used to update a cache in accordance with one or more embodiments of the invention. The method shown in FIG. 2C may be performed by, for example, a data management device (100, FIG. 1A).

In Step 240, a block of the block set of a cache device is modified based on the update that is neither: (i) in a file block including a header or (ii) in a file block including meta-data. More specifically, the data of the block that meets requirements (i) and (ii) is modified based on the update. For example, an update that modifies data stored in an allocated block that meets requirements (i) and (ii) or removes data stored in an allocated block that meets requirements (i) and (ii) may cause the block storing the data to be modified. In contrast, an update that adds new data to the cache may cause a block that meets requirements (i) and (ii) and that was not previously allocated to be modified, e.g., allocated.

In Step 241, the header of the block set and meta-data of the block set is updated based on the modification to the block that meets requirements (i) and (ii). The number of free blocks of the header may be updated based on the allocation or deallocation of a block of the blockset. The block state(s) of the block meta-data associated with the block that meets requirements (i) and (ii) may be updated based on the change in block state, e.g., allocatable, free, etc., due to the update. The block type of the block meta-data associated with the block that meets requirements (i) and (ii) may be updated in response to the change in the data stored in the block.

In Step 242, the file block(s) including the header of the blockset are file block mirrored.

In Step 243, the file block(s) including the meta-data of the blockset are file block mirrored.

The method may end following Step 243.

In one or more embodiments of the invention, multiple updates of the header and meta-data may be processed as a batch. Batch processing may reduce the IO of the physical disks hosting the cache.

Figure 2D:
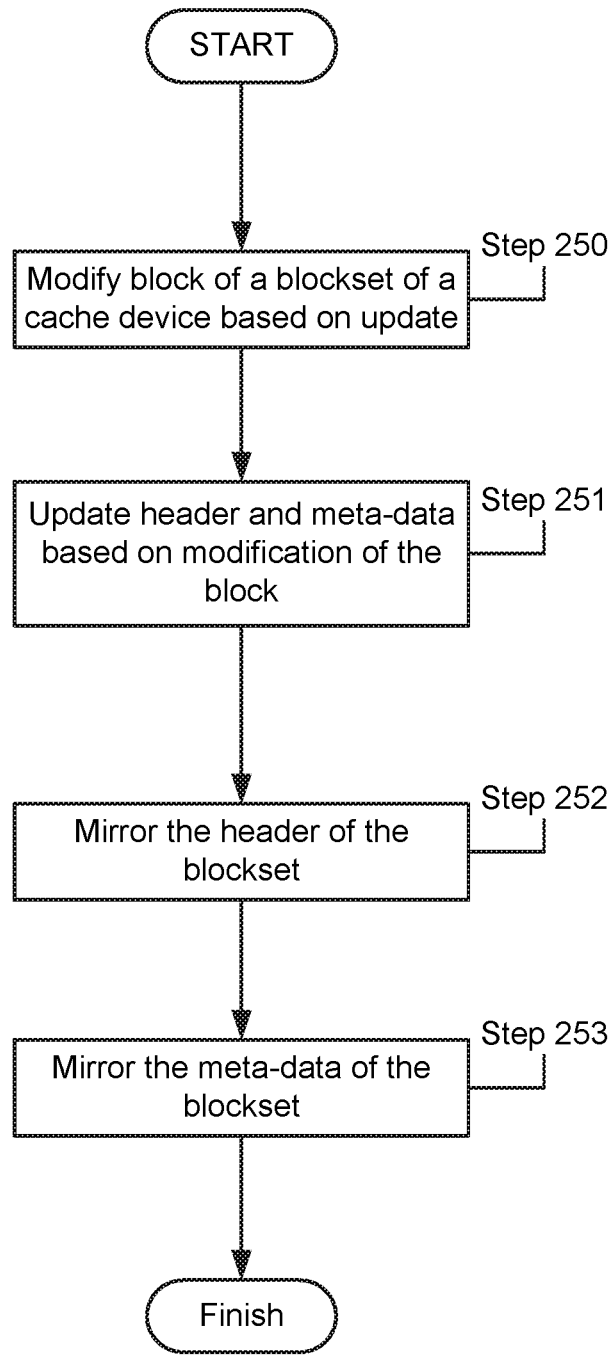
FIG. 2D shows a flowchart of a third method of updating a cache in accordance with one or more embodiments of the invention.

FIG. 2D shows a flowchart of a method in accordance with one or more embodiments of the invention. The method depicted in FIG. 2D may be used to update a cache in accordance with one or more embodiments of the invention. The method shown in FIG. 2D may be performed by, for example, a data management device (100, FIG. 1A).

In Step 250, a block of the block set of a cache device is modified based on the update. More specifically, the data of the block is modified based on the update. For example, an update that modifies data stored in an allocated block or removes data stored in an allocated block may cause the block storing the data to be modified. In contrast, an update that adds new data to the cache may cause a block that was not previously allocated to be modified, e.g., allocated.

In Step 251, the header of the block set and meta-data of the block set is updated based on the modification to the block. The number of free blocks of the header may be updated based on the allocation or deallocation of a block of the blockset. The block state(s) of the block meta-data associated with the block may be updated based on the change in block state, e.g., allocatable, free, etc., due to the update. The block type of the block meta-data associated with the block may be updated in response to the change in the data stored in the block. More specifically, the block type of the block meta-data associated with the block may be set as a master.

In Step 252, the header of the block set is mirrored. The header may be mirrored by issuing mirrored IO request to each cache device that causes the header to be written to each of the cache devices.

In Step 253, the meta-data of the block set is mirrored. The meta-data may be mirrored by issuing mirrored IO request to each cache device that causes the meta-data to be written to each of the cache devices.

The method may end following Step 253.

FIGS. 3A-3D illustrate methods of responding to data access requests. More specifically, the methods shown in FIGS. 3A-3D may enable a data management device to respond to data access requests by providing: (i) data stored in a cache in response to the requests or (ii) data stored in a data storage in response to the requests when the requested data is not available in the cache.

Figure 3A:
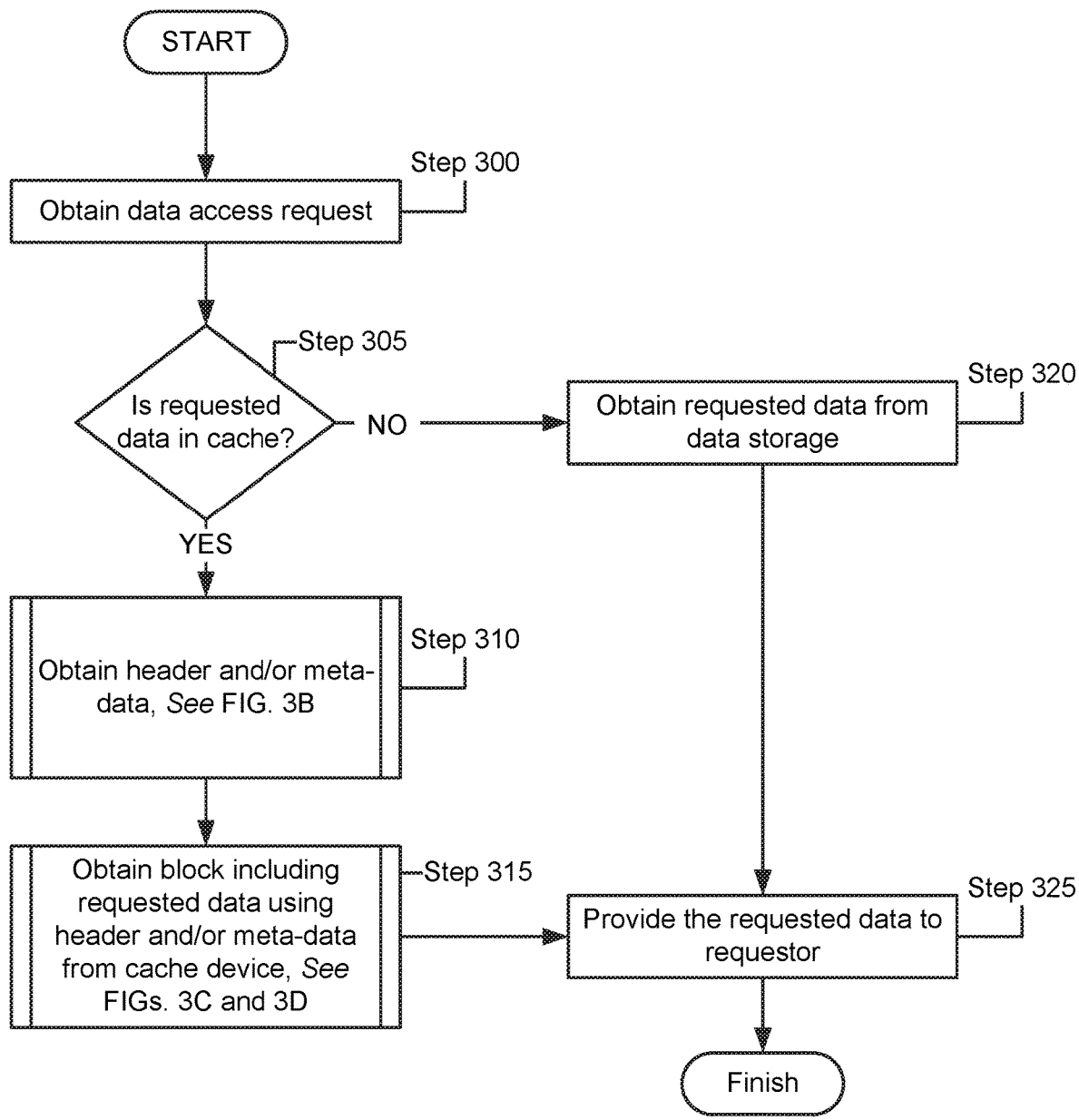
FIG. 3A shows a flowchart of a method of obtaining data from a data management device in accordance with one or more embodiments of the invention.

FIG. 3A shows a flowchart of a method in accordance with one or more embodiments of the invention. The method depicted in FIG. 3A may be used to update a cache in accordance with one or more embodiments of the invention. The method shown in FIG. 3A may be performed by, for example, a data management device (100, FIG. 1A).

In Step 300, a data access request is obtained. The data access request may be obtained by receiving the data access request from a client. The data access request may request data stored in the data management device.

In Step 305, it is determined whether a copy of the requested data is stored in the cache. The determination may be made by comparing an identifier of the requested data to the identifiers of the meta-data of the block set of the cache. If a copy of the requested data is not stored in the cache, the method may proceed to Step 320. If a copy of the requested data is stored in the cache, the method may proceed to Step 310.

In Step 310, the header and/or meta-data is obtained. The header and/or meta-data may be obtained by the method shown in FIG. 3B.

In one or more embodiments of the invention, a portion of the cache may be loaded into high speed memory. For example, previously obtained portions of the cache may be left in memory after being provided in response to other data access requests. In another example, a portion of the cache that is accessed frequently may be already loaded into memory. The header and/or meta-data of the portion of the cache loaded into memory may be used rather than obtaining the header/meta-data from physical devices hosting the cache.

In Step 315, the block including the requested data is obtained from the cache using the header and/or the meta-data. The block may be obtained by matching an identifier of the requested data to an identifier stored in the meta-data and obtaining the data in the block associated with the matched meta-data. Obtaining the block may be performed by the methods shown in FIGS. 3C and 3D.

In Step 325, the requested data is provided to the requestor. The requested data maybe provided by extracting the requested data from the block of the block obtained in Step 315. The extracted data may then be sent to the client. The method may end following Step 325.

Returning now to Step 320, the requested data is obtained from the data storage if a copy of the requested data is not present in the cache. The method may proceed to Step 325 following Step 320.

Figure 3B:
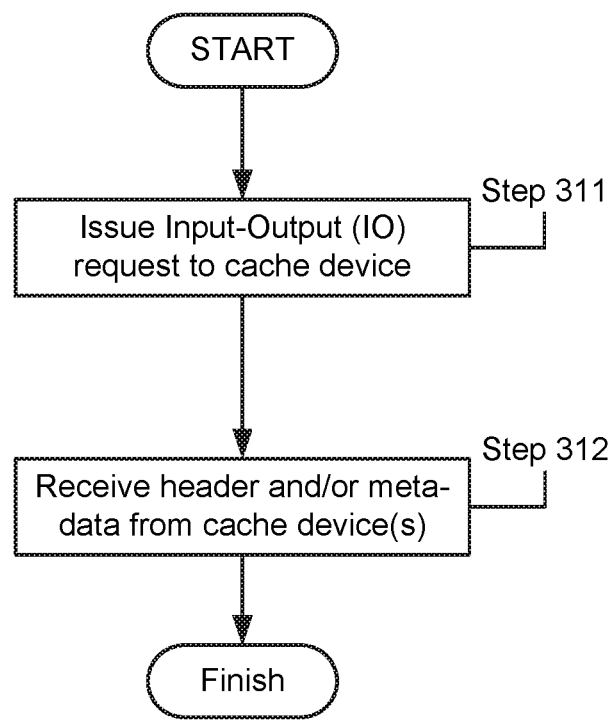
FIG. 3B shows a flowchart of a method of obtaining a header and/or meta-data of a block set in accordance with one or more embodiments of the invention.

FIG. 3B shows a flowchart of a method in accordance with one or more embodiments of the invention. The method depicted in FIG. 3B may be used to obtain a header and/or meta-data of a blockset in accordance with one or more embodiments of the invention. The method shown in FIG. 3B may be performed by, for example, a data management device (100, FIG. 1A) as part of the method illustrated in FIG. 3A.

In Step 311, an IO request is issued to the cache devices. The request may request the file block including the header and/or the file block including the meta-data.

As discussed with respect to FIG. 1B, the header and meta-data may be mirrored across all of the cache devices of the cache and thereby provide redundancy. Mirroring the header and meta-data across the cache devices may also improve access to the header and meta-data by enabling any of the cache devices to provide the header. The first cache device with available IO may respond to the IO request by providing the requested file blocks.

In Step 312, the header and/or meta-data may be received. The header and/or meta-data may be received by extracting the header and/or the meta-data from the file blocks obtained in Step 311.

The method may end following Step 312.

Figure 3C:
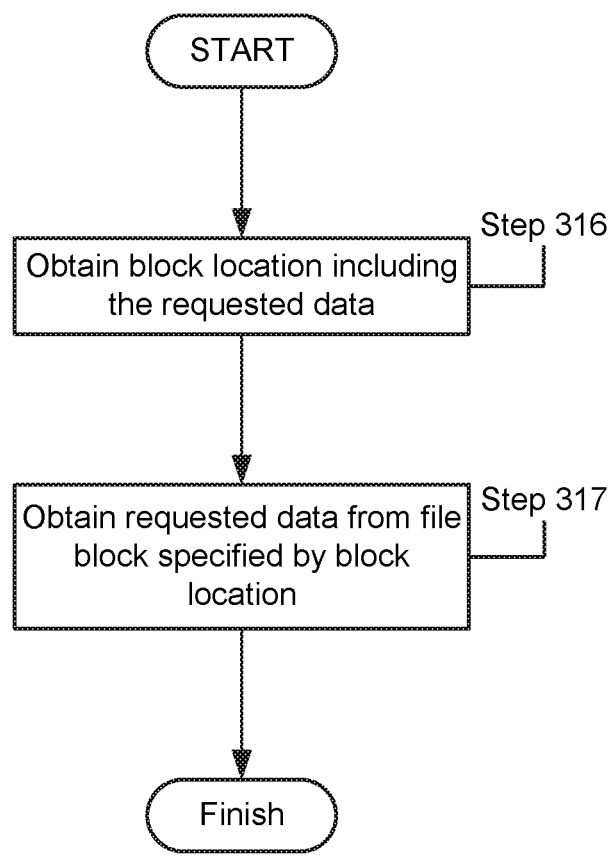
FIG. 3C shows a flowchart of a first method of obtaining a block that includes requested data in accordance with one or more embodiments of the invention.

FIG. 3C shows a flowchart of a method in accordance with one or more embodiments of the invention. The method depicted in FIG. 3C may be used to obtain a block that includes the requested data using header and/or meta-data in accordance with one or more embodiments of the invention. The method shown in FIG. 3C may be performed by, for example, a data management device (100, FIG. 1A) as part of the method illustrated in FIG. 3A.

In Step 316, the location of the block including the requested data is obtained. The location of the block may be included in the header and/or meta-data. The location of the block may indicate a file block of the file system. In other words, multiple blocks may be stored in file blocks of the file system. The location of the block may be an identifier of the file block including the block that includes the requested data.

In Step 317, the requested data is obtained from the file block specified by the block location. The requested data may be obtained by: (i) obtaining the file block specified by the block location and (ii) extracting a portion of the file block that corresponds with the block of the block set that includes the requested data.

The method may end following Step 317.

Figure 3D:
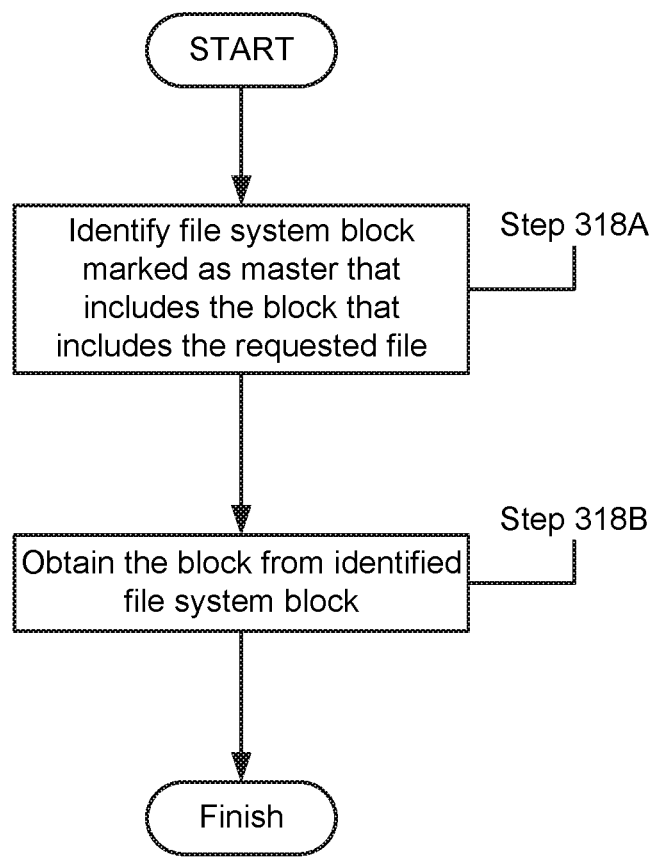
FIG. 3D shows a flowchart of a second method of obtaining a block that includes requested data in accordance with one or more embodiments of the invention.

FIG. 3D shows a flowchart of a method in accordance with one or more embodiments of the invention. The method depicted in FIG. 3D may be used to obtain a block including requested data using header and/or meta-data in accordance with one or more embodiments of the invention. The method shown in FIG. 3D may be performed by, for example, a data management device (100, FIG. 1A) as part of the method illustrated in FIG. 3A.

In Step 318A, a file system block marked as a master that includes the block that includes the requested file is identified.

In Step 318B, the block including the requested data is obtained from the identified file system block using the header and/or meta-data.

The method may end following Step 318B.

Figure 4:
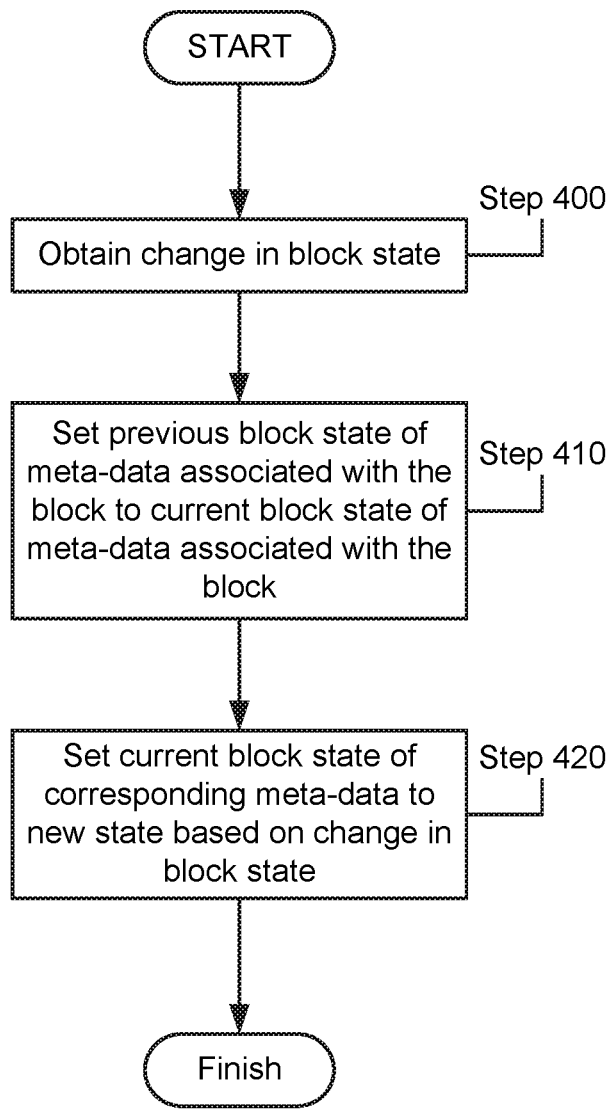
FIG. 4 shows a flowchart of a method of updating block states of meta-data associated with a block in accordance with one or more embodiments of the invention.

FIG. 4 shows a flowchart of a method in accordance with one or more embodiments of the invention. The method depicted in FIG. 4 may be used to update a current and/or previous state of a block in accordance with one or more embodiments of the invention. The method shown in FIG. 4 may be performed by, for example, a data management device (100, FIG. 1A).

In Step 400, a change in a state of a block is obtained. The change may be due to, for example, a change in a state of a cache device on which the block is stored In Step 410, a previous block state of meta-data associated with the block having the changed state is set to the current block state of the meta-data associated with the block having the changed state. In other words, the previous block state meta-data is updated based on the current state before modifying the current block state.

In Step 420, the current block state of the meta-data associated with the block having the changed state is updated based on the change in block state. In other words, the meta-data associated with the block includes both the current state and the previous state of the block. Both the previous and current block state may be updated whenever the block state is changed.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) provide a cache that can persist so long as at least one cache device on which the cache is stored survives, ii) improve the performance of the data management device by reducing the TO of the cache devices while still providing redundancy, and iii) reducing a cognitive burden on a user of the data management device by adapting the block set to the file system of the cache device without having a user align the cache to the file system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management device, comprising:
a cache for a data storage device, the cache comprising a plurality of cache devices that store a block set; and
a processor programmed to:
obtain a cache modification request that specifies a first block of the block set;
update a copy of a header of the block set in each of the plurality of cache devices based on the cache modification request;
update a copy of meta-data of the block set in each of the plurality of cache devices based on the cache modification request; and
update the first block in a first cache device of the plurality of cache devices based on the cache modification request,
wherein each cache device of the plurality of cache devices stores:
the copy of the header of the block set and copies of a plurality of other headers of a plurality of other block sets stored in a plurality of other cache devices of the plurality of cache devices, and
the copy of the meta-data of the block set and copies of a plurality of other meta-data of a plurality of other block sets stored in a plurality of the other cache devices of the plurality of cache devices,
wherein the first cache device of the plurality of cache devices stores the first block, and
wherein a second cache device of the plurality of cache devices does not store the first block.

2. The data management device of claim 1, wherein the copy of the header stored in the first cache device of the plurality of cache devices specifies:
characteristics of the first block stored in the first cache device, and
characteristics of a second block stored in a second cache device of the plurality of cache devices.

3. The data management device of claim 1, wherein each cache device of the plurality of cache devices is divided into file system blocks having a first size, wherein the header has a second size, wherein the meta-data has a third size.

4. The data management device of claim 3, wherein the first size is different than at least one selected from the group consisting of the second size and the third size.

5. The data management device of claim 1, wherein the processor is further programmed to:
obtain a data access request for requested data,
make a first determination that the requested data is stored in the cache,
obtain, in response to the first determination, at least one selected from a group consisting of a header of the block set and meta-data of the block set that is associated with a second block of the block set that includes the requested data, and
provide the requested data, from the cache, using at least one selected from the group consisting of the header of the block set and the meta-data of the block set that is associated with the second block of the block set that includes the requested data.

6. The data management device of claim 1, wherein updating a copy of a header of the block set in each of the plurality of cache devices based on the cache modification request comprises:
generating an updated header based on the cache modification request; and
file block mirroring the header in each cache device of the plurality of cache devices.

7. The data management device of claim 6, wherein file block mirroring the header in each cache device of the plurality of cache devices comprises:
issuing a mirrored input-output (TO) write to each cache device of the plurality of cache devices,
wherein the mirrored IO write specifies the header,
wherein the mirrored IO write mirrors a file system block.

8. The data management device of claim 7, wherein the mirrored IO write further specifies a portion of a second block of the block set, wherein the portion of the second block of the block set is a portion of the file system block.

9. The data management device of claim 7, wherein the mirrored IO write further specifies a portion of an unused block of the block set, wherein the portion of the unused block of the block set is a portion of the file system block.

10. The data management device of claim 9, wherein the file system block, mirrored by the mirrored IO write, further comprises the header.

11. The data management device of claim 2, wherein the header is allocated to a mirrored portion of a file system block that is larger than the header, wherein the mirrored portion comprises the header and the second block, and wherein the mirrored portion is stored on each cache device of the plurality of cache devices.

12. A method of operating a data management device, comprising:

obtaining, by the data management device, a cache modification request that specifies a first block of the block set of a cache of the data management device;

updating, by the data management device, a copy of a header of the block set in each cache device of a plurality of cache devices of the cache based on the cache modification request;

updating, by the data management device, a copy of meta-data of the block set in each of the plurality of cache devices based on the cache modification request; and updating, by the data management device, the first block in a first cache device of the plurality of cache devices based on the cache modification request, wherein each cache device of the plurality of cache devices stores:
the copy of the header of the block set and a plurality of other headers of a plurality of other block sets stored in a plurality of other cache devices of the plurality of cache devices, and
the copy of the meta-data of the block set and a plurality of other meta-data of a plurality of other block sets stored in a plurality of the other cache devices of the plurality of cache devices, wherein the first cache device of the plurality of cache devices stores the first block, and wherein a second cache device of the plurality of cache devices does not store the first block.

13. The method of claim 12, further comprising:
obtaining, by a data storage device, a data access request;
making, by the data storage device, a first determination that requested data specified by the data access request is stored in the cache;
obtaining, by the data storage device, at least one selected from a group consisting of a header of the block set and meta-data of the block set that is associated with a second block of the block set that includes the requested data; and
providing, by the data storage device, the requested data from the cache using at least one selected from the group consisting of the header of the block set and the meta-data of the block set that is associated with the second block of the block set that includes the requested data.

14. The method of claim 13, further comprising:
obtaining, by the data storage device, a second data access request;
making, by the data storage device, a second determination that second requested data specified by the second data access request is not stored in the cache;
obtaining, by the data storage device, the second requested data from data storage; and
providing, by the data storage device, the second requested data after obtaining the second requested data from the data storage.

15. The method of claim 12, further comprising:
obtaining, by a data storage device, a change in a block state of a third block of the block set;
updating, by the data storage device, a first portion of the meta-data of the copy of the meta-data of the block set associated with the third block that specifies a previous state of the third block based on a second portion of the meta-data of the copy of the meta-data of the block set associated with the third block that specifies a current state of the third block; and after updating the first portion of the meta-data, updating, by the data management device, the second portion of the meta-data of the copy of the meta-data of the block set associated with the third block that specifies a current state of the third block based on the change in the block state of the third block.

16. The method of claim 15, wherein the change in the block state of the third block indicates that the third block is unallocatable.

17. The method of claim 15, updating the second portion of the meta-data of the copy of the meta-data of the block set associated with the third block that specifies a current state of the third block based on the change in the block state of the third block prevents input-output (TO) with the third block of the block set.

18. A non-transitory computer readable medium comprising computer readable program code, which when executed by a computer processor enables the computer processor to perform a method for operating a data management device, the method comprising:
obtaining, by the data management device, a cache modification request that specifies a first block of the block set of a cache of the data management device;
updating, by the data management device, a copy of a header of the block set in each cache device of a plurality of cache devices of the cache based on the cache modification request;
updating, by the data management device, a copy of meta-data of the block set in each of the plurality of cache devices based on the cache modification request; and
updating, by the data management device, the first block in a first cache device of the plurality of cache devices based on the cache modification request, wherein each cache device of the plurality of cache devices stores:
the copy of the header of the block set and a plurality of other headers of a plurality of other block sets stored in a plurality of other cache devices of the plurality of cache devices, and
the copy of the meta-data of the block set and a plurality of other meta-data of a plurality of other block sets stored in a plurality of the other cache devices of the plurality of cache devices,
wherein the first cache device of the plurality of cache devices stores the first block, and
wherein a second cache device of the plurality of cache devices does not store the first block.

19. The non-transitory computer readable medium of claim 18,
wherein updating a copy of a header of the block set in each of the plurality of cache devices based on the cache modification request comprises:
generating, by the data management device, an updated header based on the cache modification request; and
file block mirroring, by the data management device, the header in each cache device of the plurality of cache devices.

* * * * *